US008444898B2

(12) United States Patent
Tam et al.

(10) Patent No.: US 8,444,898 B2
(45) Date of Patent: May 21, 2013

(54) HIGH MOLECULAR WEIGHT POLY(ALPHA-OLEFIN) SOLUTIONS AND ARTICLES MADE THEREFROM

(75) Inventors: Thomas Y.-T. Tam, Richmond, VA (US); Qiang Zhou, Midlothian, VA (US); John A. Young, Midlothian, VA (US); Charles R. Arnett, Richmond, VA (US); John D. Brodie, Richmond, VA (US); Conor J. Twomey, Tipperary (IE); Lori L. Wagner, Richmond, VA (US); Sheldon Kavesh, Whippany, NJ (US)

(73) Assignee: Honeywell International Inc, Morristown, NJ (US)

( * ) Notice: Subject to any disclaimer, the term of this patent is extended or adjusted under 35 U.S.C. 154(b) by 1498 days.

(21) Appl. No.: 11/393,218

(22) Filed: Mar. 30, 2006

(65) Prior Publication Data

US 2007/0231572 A1 Oct. 4, 2007

(51) Int. Cl.
*C08J 3/00* (2006.01)
*B29C 47/00* (2006.01)

(52) U.S. Cl.
USPC .............. 264/211.21; 264/204; 264/210.7; 264/211.22

(58) Field of Classification Search
USPC ............ 264/204, 210.7, 211.21, 211.22, 264/211.23; 425/76
See application file for complete search history.

(56) References Cited

U.S. PATENT DOCUMENTS

| | | | | |
|---|---|---|---|---|
| 3,119,704 | A | * | 1/1964 | Harrell et al. ................. 106/682 |
| 4,344,908 | A | | 8/1982 | Smith et al. ................... 264/203 |
| 4,405,399 | A | * | 9/1983 | Gibbons ........................ 156/243 |
| 4,413,110 | A | | 11/1983 | Kavesh et al. ............. 526/348.1 |
| 4,430,383 | A | | 2/1984 | Smith et al. .................... 428/364 |
| 4,440,711 | A | | 4/1984 | Kwon et al. ................... 264/185 |
| 4,663,101 | A | | 5/1987 | Kavesh et al. ............. 264/178 F |
| 4,668,717 | A | | 5/1987 | Lemstra et al. ................ 523/322 |
| 4,778,601 | A | * | 10/1988 | Lopatin et al. ........... 210/500.27 |
| 4,784,820 | A | * | 11/1988 | Kavesh .......................... 264/349 |
| 4,883,628 | A | | 11/1989 | Kwon et al. ............. 264/178 E |
| 5,032,338 | A | | 7/1991 | Weedon et al. ................ 264/103 |
| 5,529,690 | A | * | 6/1996 | Pashley et al. ................ 210/490 |
| 5,607,636 | A | * | 3/1997 | Ito et al. ......................... 264/205 |
| 6,448,359 | B1 | * | 9/2002 | Kavesh .......................... 526/352 |
| 6,506,695 | B2 | * | 1/2003 | Gardner et al. ................. 442/76 |
| 2004/0071849 | A1 | * | 4/2004 | Kikuchi et al. ............... 426/486 |

FOREIGN PATENT DOCUMENTS

| | | |
|---|---|---|
| WO | WO 00/61647 | * 10/2000 |
| WO | WO 2005/066400 | 7/2005 |
| WO | WO 2005/066401 | 7/2005 |
| WO | WO 2006073743 | 7/2006 |

OTHER PUBLICATIONS

Some Special Feautres of Spinning of Polyethylene Gel-Fibre V.G. Alekseev Fibre Cehmistry, vol. 27, No. 2, 1995.*
J. Smook and A. J. Pennings, "Suspension Spinning of Ultra-hihg Molecular Weight Polyethylene". *Poly. Bull.*. 10, 291-2978 (1983).

* cited by examiner

*Primary Examiner* — Richard Crispino
*Assistant Examiner* — Martin Rogers

(57) ABSTRACT

A robust process for the continuous preparation of solutions of high molecular weight UHMW PO that is capable of producing strong materials at high production capacity, is conservative of capital and energy requirements, and the articles made therefrom.

30 Claims, No Drawings

HIGH MOLECULAR WEIGHT POLY(ALPHA-OLEFIN) SOLUTIONS AND ARTICLES MADE THEREFROM

BACKGROUND OF THE INVENTION

1. Field of the Invention

The invention relates to a process for the continuous preparation of solutions of high molecular weight poly(alpha-olefin)and molded articles made therefrom.

2. Description of the Related Art

Several process for the solution spinning of high molecular weight polymers have been described in the prior art. The solution spinning of high molecular weight polyethylene was described in U.S. Pat. Nos. 4,413,110, 4,344,908, 4,430,383 and 4,663,101 for example, all of which are hereby incorporated by reference to the extent not incompatible herewith. The solution spinning of high molecular weight polyvinyl alcohol and high molecular weight polyacrylonitrile were described in U.S. Pat. Nos. 4,440,711 and 4,883,628 respectively.

Methods of continuous preparation of solutions of high molecular weight polymers in conjunction with solution spinning were described in U.S. Pat. Nos. 4,413,110, 4,440,711, 4,663,101, 4,668,717, 4,784,820, 4,883,628, 5,032,338, WO 2005/066400, WO 2005/066401 and in a publication titled "Suspension Spinning of Ultra-high Molecular Weight Polyethylene" by J. Smook and A. J. Pennings, *Polymer Bulletin,* 10, 291-297 (1983).

U.S. Pat. No. 4,413,110 described a process wherein a slurry of high molecular weight polyethylene was formed in a first vessel. With sufficient residence time, the slurry was converted to a solution in an intensive mixer. The polymer solution was fed to an extruder and then to a spinneret by means of a gear pump.

U.S. Pat. No. 4,668,717 described a process in which a suspension of high molecular weight polyethylene in decalin at room temperature was fed to a co-rotating twin screw extruder having alternate mixing and transporting sections. With sufficient residence time, shear rate and temperature, a solution of the polymer was formed in the extruder and delivered to an aperture, optionally through a gear pump. WO 2005/066400 and WO 2005/066401 describe use of a twin screw extruder to form a polymer solution in conjunction with particular spinning and drawing conditions.

U.S. Pat. No. 4,784,820 described a process in which a slurry of high molecular weight polymer was formed and transferred under pressure by means of a positive displacement pump to a screw extruder. With sufficient residence time and temperature, a solution was formed in the extruder and fed to a spinneret by means of a metering pump.

U.S. Pat. No. 5,032,338 described two processes. In one process, a slurry of high molecular weight polyethylene was formed in a mixing vessel and then passed through a heated coiled tube and directly to a spinneret. In a second process, a slurry of high molecular weight polyethylene was formed in a mixing vessel. The slurry was passed through a pre-heater for a time and temperature sufficient to dissolve 5 to 50% of the polymer. The dissolution process was completed in a screw extruder and the solution was passed to a gear pump and spinneret. The particle size distribution of the polyethylene was such that at least 75 wt. % of particles were in the range of 100 to 400 microns in size.

The above mentioned publication, by J. Smook and A. J. Pennings, described the semi-continuous preparation of high molecular weight polyethylene solutions. A suspension of polyethylene powder was formed in a solution of aluminum stearate in a mixed solvent consisting of 80/20 v/v paraffin oil/1,2,4-trichlorobenzene having a density matching the polyethylene density. The polyethylene solution was formed by pumping this suspension through a heated coiled tube with a residence time of about 30 minutes. It was noted that special care had to be taken to prevent plugging of the tube.

Each of the patents and publications cited above represented progress in the state of the art. However, none described the specific process of this invention and none satisfied all of the needs met by this invention. These earlier methods had several disadvantages. The intensive mixers and screw extruders described by several of the prior art patents are both capital intensive and power intensive. They are excellent devices for distributive mixing but are very costly devices for provision of residence time. In order to provide sufficient residence time for completion of the dissolution process in these devices, throughput rates and production capacities were underutilized. The tubular dissolvers described by U.S. Pat. No. 5,032,338 and the aforementioned article by Smook and Pennings were sensitive to the particle size distribution of the polymer and/or were subject to plugging.

A need exists for a robust process for that is capable of producing strong materials at high production capacity, is insensitive to polymer particle size distribution and is conservative of capital and energy requirements

SUMMARY OF THE INVENTION

The invention is a high productivity process for the continuous preparation of solutions of ultra high molecular weight poly(alpha-olefins) and molded articles made therefrom. For the purposes of the invention an ultra high molecular weight poly(alpha-olefin) (hereinafter optionally abbreviated as UHMW PO) is defined as one having an intrinsic viscosity measured in decalin at 135° C of from 5 to 45 dl/g. The UHMW PO may be a homopolymer, such as for example, polyethylene, polypropylene, polybutene-1, or it may be a copolymer of alpha-olefins, or it may consist of at least 50 mol % of an alpha-olefin monomer co-polymerized with a non-olefinic monomer.

In a first embodiment, the invention is a process for the continuous preparation of solutions comprising up to 50 wt. % of UHMW PO having an intrinsic viscosity of from 5 to 45 dl/g measured in decalin 135° C comprising the steps of:

a) forming a slurry of UHMW PO particles in a solvent for the UHMW PO at a first temperature which is below the temperature at which the UHMW PO particles will dissolve in the solvent:

b) processing the slurry through an extruder operating such that a mixture of the solvent and the UHMW PO is formed at a second temperature above the melting temperature of the UHMW PO, and the throughput rate of UHMW PO in the mixture is at least the quantity $2.5 D^2$ ($2.5 \times D \times D$) grams per minute wherein D represents the screw diameter of the extruder in centimeters;

c) optionally, discharging the mixture from the extruder through a positive displacement pump;

d) passing the mixture through a heated vessel at a temperature above the melting temperature of the UHMW PO, the vessel having a volume such that the average residence time of the mixture in the vessel is from 2 to 120 minutes, whereby a solution of the UHMW PO is formed.

In another embodiment, the invention is a process for the continuous preparation of molded articles from slurries of UHMW PO comprising the steps:

a) forming a slurry of UHMW PO particles having an intrinsic viscosity measured in decalin at 135° C of from 5 to 45 dl/g in a solvent for the UHMW PO at a first temperature which is below the temperature at which the UHMW PO particles will dissolve in the solvent:

b) processing the slurry through an extruder operating such that a mixture of the solvent and the UHMW PO is formed at a temperature above the melting temperature of the UHMW PO, and the throughput rate of UHMW PO in the mixture is at least the quantity 2.5 $D^2$ ( 2.5× D×D) grams per minute wherein D represents the screw diameter of the extruder in centimeters;

c) optionally, discharging the mixture from the extruder through a positive displacement pump;

d) passing the mixture through a heated vessel at a temperature above the melting temperature of the UHMW PO, the vessel having a volume such that the average residence time of the mixture in the vessel is from 2 to 120 minutes, whereby a solution of the UHMW PO is formed;

e) passing the thus-formed solution out of the vessel through a positive displacement pump and through a shaping orifice, the solution being at a temperature below the atmospheric boiling point of the solvent to form a molded solution article;

f) optionally, stretching the molded solution article;

g) cooling the molded solution article to form a molded gel article;

h) optionally stretching the molded gel article;

i) removing the solvent from the molded gel article to form a molded solid article; and j) optionally stretching the solid article in one or more steps at temperatures from 25° C. to 165° C.

In another embodiment, the invention is a molded gel article prepared by the above method. In yet another embodiment, the invention is a molded solid article prepared by the above method.

DETAILED DESCRIPTION OF THE INVENTION

The preparation of solutions of UHMW PO is not a trivial task. One of the difficulties lies in the determination of when a solution has formed. Some prior art workers have assumed that the formation of a clear liquid was an indication of the end point of the dissolution process and evidence of homogeneity. The fallacy of this assumption was illustrated in a study of the dissolving of a single ultrahigh molecular weight polyethylene particle of about 150 micron diameter in a static solvent on a hot stage microscope (M. Rammoorthy, Honeywell International Inc. unpublished work). As the hot stage temperature approached the polyethylene melting point, the particle gradually seemingly "dissolved" at its outer fringes and then disappeared from view over a narrow temperature range and within a short time. However, when the hot stage was cooled down, the particle re-crystallized and reappeared. It had not dissolved after all. Apparently, the particle had simply melted without dissolving. In the molten state, the particle could not be seen because the index of refraction of the molten polyethylene was very close to that of the solvent. Thus, the appearance of a clear liquid was not an indication that the ultrahigh molecular weight polyethylene had dissolved and was not an indication that a "homogeneous solution" had formed.

To form a solution of UHMW PO, two conditions are axiomatic. First, the temperature must be near or above the melting temperature of the crystalline polymer. Second, sufficient time must be allowed for the solvent to diffuse into the polymer and for the polymer to diffuse into the solvent.

The situation becomes more complex when dealing with a host of particles as for example at UHMW PO concentrations above about 2 wt. %. When a slurry of UHMW PO particles in a solvent is heated to a temperature close to the polymer melting point, the particles coalesce and agglomerate. The solvent/polymer mixture then comprises domains of both very high and very low concentrations of polymer, with the different domains having radically different viscosities. This problem appears not to have been recognized by others.

The task of preparing solutions of UHMW PO at concentrations of from about 2 wt. % up to about 50 wt. %. may be considered to have the following stages:

1. Formation of slurry, i.e., a dispersion of the solid polymer particles, in a solvent capable of dissolving the polymer.

2. Heating the slurry to melt the polymer and to form a liquid mixture under conditions of intense distributive and dispersive mixing with a view to reducing the domain sizes of molten polymer and solvent in the mixture to microscopic dimensions.

3. Allowing sufficient time for diffusion of solvent into polymer and polymer into solvent to occur.

In prior art processes, both the second and third stages were attempted to be accomplished in intensive mixing devices such as extruders by operating these devices at less than their throughput capacity in order to provide residence time. The result was inefficient use of the productive capabilities of these capital intensive and energy intensive machines. The capacity of an extruder scales as approximately the square of the screw diameter. A figure of merit for an extrusion operation is therefore the proportion between the polymer throughput rate and the square of the screw diameter. The present invention is a process that is conservative of both capital and energy requirements and that is capable of producing strong materials at high production capacity. The invention also includes the materials thereby produced.

In one embodiment, the invention is a process for the continuous preparation of solutions comprising up to 50 wt. % of UHMW PO having an intrinsic viscosity measured in decalin 135° C of from 5 to 45 dl/g comprising the steps of:

a) forming a slurry of UHMW PO in a solvent for the UHMW PO at a first temperature which is below the temperature at which the UHMW PO will dissolve in the solvent:

b) processing the slurry through a extruder operating such that a mixture of the solvent and the UHMW PO is formed at a second temperature above the melting temperature of the UHMW PO, and the throughput rate of UHMW PO in the mixture is at least the quantity 2.5 $D^2$ (2.5×D×D) grams per minute wherein D represents the screw diameter of the extruder in centimeters;

c) optionally, discharging the mixture from the extruder through a positive displacement pump;

d) passing the mixture through a heated vessel at a temperature above the melting temperature of the UHMW PO, the vessel having a volume such that the average residence time of the mixture in the vessel is from 2 to 120 minutes, whereby a solution of the UHMW PO is formed.

The high productivity process of the invention produces UHMW PO solutions of improved uniformity and homogeneity as compared to the prior art as evidenced by the ability to produce stronger fibers therefrom.

Preferably, in the process of the invention the average residence time of the mixture in the extruder is at most the quantity 0.6 D (0.6×D) where D is the screw diameter in centimeters. More preferably, the average residence time of the mixture in the extruder is at most the quantity 0.4 D. The average residence time is defined as the free volume of the extruder (barrel minus screw) divided by the volumetric throughput rate, e.g., free volume in cm$^3$ divided by throughput rate in cm$^3$/min yielding average residence time in minutes.

Preferably in the process of the invention, the throughput rate of UHMW PO is at least 4 D$^2$ grams/min wherein D is the screw diameter of the extruder in centimeters. More preferably the throughput rate of the throughput rate of UHMW PO is at least 6 D$^2$ grams/min wherein D is the screw diameter of the extruder in centimeters. Yet more preferably, the throughput rate of UHMW PO is at least 10 D$^2$ grams/min wherein D is the screw diameter of the extruder in centimeters. Presently, the inventive process has achieved a multiple of 15.8 D$^2$. However, as the inventive process is scaled up and made more efficient, it is anticipated that still higher multiples such as 20 D$^2$, 30 D$^2$ and 40 D$^2$ will be achieved. Most preferably, the throughput rate of UHMW PO is from 2.5 D$^2$ to 40 D$^2$ grams/min wherein D is the screw diameter of the extruder in centimeters.

The extruder employed in the inventive process has as its function the transformation of a polymer slurry into an intimate mixture of molten polymer and solvent, ideally with domain sizes of microscopic dimensions. The extruder must have sufficient heating and distributive mixing capabilities to accomplish this objective. The extruder may be a single screw extruder, or it may be a non-intermeshing twin screw extruder or an intermeshing counter-rotating twin screw extruder. Preferably, the extruder employed in the inventive process is an intermeshing co-rotating twin screw extruder. Preferably, the screw elements of the intermeshing co-rotating twin screw extruder are forwarding conveying elements.

The liquid mixture produced in the extruder is discharged into a heated vessel, optionally through a positive displacement pump such as a gear pump. The heated vessel provides the residence time necessary to permit transformation of the intimate polymer/solvent mixture into a true solution. Too short a residence time prevents full solution formation. Too long a residence time may lead to degradation of the polymer. Preferably, the average residence time in the vessel is from 2 to 90 minutes. More preferably, the average residence time in the vessel is from 4 to 60 minutes. The average residence time is defined as the internal volume of the vessel divided by the volumetric throughput rate, e.g., volume in cm$^3$ divided by throughput rate in cm$^3$/min yielding average residence time, min.

The heated vessel may have any shape provided its internal volume is sufficient to provide the necessary residence time. However, it is desirable that the residence time distribution in the vessel be as narrow as possible. It is preferred that the vessel is a heated pipe. The heated pipe may be a straight length of pipe, or it may have bends, or it may be a helical coil. It may comprise sections of differing length and diameter chosen so that the pressure drop through the pipe is not excessive. As the polymer/solvent mixture entering the pipe is highly pseudoplastic, it is preferred that the heated pipe contain one or more static mixers to redistribute the flow across the pipe cross-section at intervals, and/or to provide additional dispersion.

The heating may be provided by external jacketing and circulation of heat transfer fluid, or the pipe may be electrically heated by contact with resistive elements, or the pipe may be heated by induction coupling to a power source. It is preferred that the heating be done by external circulation of a heat transfer fluid.

The productivity of the inventive process and the properties of the articles produced depend on the concentration of the UHMW PO solution and the degree of approach to an ideal homogeneous solution. Higher polymer concentrations provide the potential for higher productivity but are also more difficult to dissolve. Preferably, the UHMW PO concentration in the solution is from 2 to 30 wt. % (2 to 30 percent UHMW PO by weight of solution). More preferably, the UHMW PO concentration in the solution is from 5 to 20 wt. %.

Preferably, the UHMW PO is a linear polyethylene having an intrinsic viscosity from 9 to 30 dl/g measured in decalin at 135° C. Generally, higher fiber properties are obtained from polyethylene having higher intrinsic viscosity, but at higher intrinsic viscosity, the dissolving process will generally require longer residence times.

Preferably, the linear polyethylene has fewer than two substituent groups per 1000 carbon atoms, and more preferably, fewer than one substituent group per 1000 carbon atoms.

The solvent employed in the process of the invention is preferably selected from the group consisting of aliphatics, aromatics, cyclo-aliphatics, halogenated aliphatics, halogenated aromatics, halogenated cyclo-aliphatics and mixtures thereof. More preferably, the solvent is selected from the group consisting of mineral oil and decalin or their mixture.

The formation of the slurry of UHMW PO in the solvent may be done in an agitated mixing tank. UHMW PO particles and solvent may be continuously fed to the mixing tank with the slurry formed being discharged to the extruder. The mixing tank may be heated. The temperature and residence time of the slurry in the mixing tank are optionally such that the UHMW PO particles will absorb at least 5 wt. % of solvent at a temperature below that at which the UHMW PO will dissolve. Preferably, the slurry temperature leaving the mixing tank is from about 40° C to about 100° C.

Several alternative modes of feeding the extruder are contemplated. A UHMW PO slurry formed in a mixing tank may be fed to the extruder feed hopper under no pressure. Preferably, a slurry enters a sealed feed zone of the extruder under a positive pressure at least about 20 KPa. The feed pressure enhances the conveying capacity of the extruder. Alternatively, the slurry may be formed in the extruder. In this case, the UHMW PO particles may be fed to an open extruder feed hopper and the solvent is pumped into the extruder one or two barrel sections further forward in the machine. In yet another alternative feed mode, a concentrated slurry is formed in a mixing tank. This enters the extruder at the feed zone. A pure solvent stream pre-heated to a temperature above the polymer melting temperature enters the extruder several zones further forward. In this mode, some of the process heat duty is transferred out of the extruder and its productive capacity is enhanced.

In another embodiment, the invention is a process for the continuous formation of molded articles from slurries of UHMW PO. Preferably, the molded article is selected from the group consisting of a fiber, tape, film, sheet and tube. For the purposes of the present invention, a fiber is an elongate body the length dimension of which is much greater that the transverse dimensions of width and thickness. Accordingly, the term fiber includes filament, ribbon, strip, and the like having regular or irregular cross-section. A yarn is a continuous strand comprised of many fibers or filaments.

In this embodiment, the process of the invention comprises the steps:

a) forming a slurry of UHMW PO particles having an intrinsic viscosity of from 5 to 45 dl/g in a solvent for the UHMW PO at a first temperature below the temperature at which the UHMW PO will dissolve in the solvent:

b) processing the slurry through a extruder operating such that a mixture of the solvent and the UHMW PO is formed at a second temperature above the melting temperature of the UHMW PO, and the throughput rate of UHMW PO in the mixture is at least the quantity 2.5 $D^2$ (2.5×D×D) grams per minute wherein D represents the screw diameter of the extruder in centimeters, c) optionally, discharging the mixture from the extruder through a positive displacement pump;

d) passing the mixture through a heated vessel at a temperature above the melting temperature of the UHMW PO, the vessel having a volume such that the average residence time of the mixture in the vessel is from 2 to 120 minutes, whereby a solution of the UHMW PO is formed;

e) passing the thus-formed solution out of the vessel through a positive displacement pump and through a shaping orifice, the solution being at a temperature below the atmospheric boiling point of the solvent to form a molded solution article;

f) optionally, stretching the solution article;

g) cooling the molded solution article to form a molded gel article;

h) optionally stretching the molded gel article;

i) removing the solvent from the molded gel article to form a molded solid article; and j) optionally stretching the molded solid article in one or more steps at temperatures from 25° C to 165° C.

The invention also includes molded gel articles and molded solid articles selected from the group consisting of gel fibers, tapes, films, sheets and tubes, and solid fibers, tapes, films, sheets and tubes prepared by the above method. The molded solid articles are useful in applications such as ballistic protection, spall shields, reinforced composites of plastics and concrete, ropes, nets, sails, sutures, radomes, pipes and many others.

Preferably, the article of the invention is an UHMW PO fiber having a tenacity at least 27 g/d (23.8 cN/dtex), more preferably, at least 35 g/d (30.9 cN/dtex), yet more preferably 40 g/d (35.3 cN/dtex), and most preferably, at least 50 g/d (44.1 cn/dtex).

The following examples are presented to provide a more complete understanding of the invention. The specific techniques, conditions, materials, proportions and reported data set forth to illustrate the principles of the invention are exemplary and should not be construed as limiting the scope of the invention.

EXAMPLES

Comparative Example 1

A 20 wt. % suspension of an UHMW PO comprising polyethylene having an intrinsic viscosity of 18.5 dl/g was prepared in decalin at room temperature. The suspension was extruded through a Werner and Pfleiderer intermeshing co-rotating twin screw extruder, type ZSK having a screw diameter of 30 mm (3 cm) and an L/D ratio of 27. The extrudate temperature was about 180° C. The residence time in the extruder was 3 minutes. The residence time in the extruder was larger than the quantity 0.6 D=0.6×3=1.8 min. where D is the extruder screw diameter in centimeters.

The extruder manufacturer, Werner and Pfleiderer, indicates that the free volume of this machine (barrel volume minus screw volume) was 362 cm$^3$. A residence time of 3 minutes corresponded to a throughput rate of 362 cm$^3$/3 min=121 cm$^3$/min. The density of polyethylene at 180° C is 0.756 g/cm$^3$. The density of decalin at 180° C is 0.744 g/cm$^3$. The density of a 20 wt. % mixture of polyethylene in decalin at 180° C was therefore 0.746 g/cm$^3$ and the throughput rate of polyethylene was 0.746 g/cm$^3$×121 cm$^3$/min×0.20 g PE/g sol'n=18.0 g PE/min. The UHMW PO (polyethylene) throughput rate was therefore less than the quantity 2.5 $D^2$=2.5×(3)$^2$=22.5. The extrudate was not further processed.

The data for this comparative example is summarized in Table I below.

Comparative Examples 2a and 2b

A number of decalin solutions of UHMW PO's (linear polyethylenes having an intrinsic viscosity of either 15.5 dl/g or 18 dl/g) and having concentrations of either 3 wt. % or 5 wt. % were prepared in the twin screw extruder described in Comparative Example 1. The minimum residence time in the extruder in any experiment was 1.7 minutes. The mixtures leaving the extruder passed through a gear pump and then through a spinning aperture of 1 mm diameter. The solution filament was quenched with water to form a gel filament. The gel filament was extracted with dichloromethane to remove the decalin followed by stretching at 120° C.

The maximum UHMW PO throughput was 3.81 g/min in any experiment at a UHMW PO concentration of 3 wt. %, and 6.35 g/min in any experiment at a UHMW PO concentration of 5 wt. %. The maximum UHMW PO throughput rate in grams/min in all experiments was therefore less than the quantity 2.5 $D^2$=2.5×(3)$^2$=22.5.

The tensile strengths of the single filaments obtained averaged 2.5 GPa (25.8 cN/dtex) at a concentration of 3 wt. %, and averaged 2.0 GPa (20.6 cN/dtex)) at a UHMW PO concentration of 5 wt. %. The maximum single filament tensile strength obtained was 3.2 GPa (33 cN/dtex) at a UHMW PO concentration of 3 wt. % (Comparative Example 2a) and 2.9 GPa (29.9 cN/dtex) at a UHMW PO concentration of 5 wt. % (Comparative Example 2b).

The data for these comparative examples are summarized in Table I below.

Example 1

A slurry was prepared in an agitated mix tank at room temperature consisting of 10 wt. % of an UHMW PO and 90 wt. % of white mineral oil. The UHMW PO was a linear polyethylene having an intrinsic viscosity of 25 dl/g in decalin at 135° C. The linear polyethylene had fewer than about 0.5 substituents per 1000 carbon atoms, and a melting point of 138° C. The white mineral oil was HYDROBRITE® 550 PO, a low volatility oil from Crompton Corporation, consisting of about 70% paraffinic carbon and about 30% of naphthenic carbon.

The slurry was continuously fed into the feed hopper of an intermeshing twin screw extruder having a screw diameter of 40 mm (4 cm). The screw elements were all forwarding conveying elements. The free volume in this extruder (barrel volume minus screw volume) was 1400 cm$^3$. The extruder barrel temperature was 260° C. The screw rotational speed was 300 RPM. The UHMW PO/mineral oil slurry was converted to a liquid mixture at 260° C in passing through the extruder with an average residence time of 2.3 minutes. The average residence time in the extruder in this example of the invention was therefore less than the quantity 0.6 D=0.6×4=2.4 min. where D is the extruder screw diameter in centimeters.

The throughput rate of slurry was 423.6 g/min and the throughput rate of UHMW PO was 42.36 grams/min. The throughput rate of UHMW PO in grams/min therefore exceeded the quantity $2.5 D^2=2.5\times(4)^2=40$ in this example of the invention.

The liquid mixture leaving the extruder passed through a gear pump and thence through a vessel consisting of an externally heated pipe at a temperature of 273° C, a length of 46.5 feet (14.17 meters), an internal volume of 29,212 cm$^3$ and several bends and changes in diameter. At intervals within the pipe there were seven static mixers having L/D ratios of 8. The liquid mixture was converted to a solution in passing through the vessel with an average residence time of 46.7 minutes.

The UHMW PO solution leaving the pipe vessel was passed through a gear pump and thence through a spin block and a spinneret having holes of 0.035 in. (0.889 mm) diameter to form a solution yarn of 240 filaments. The solution yarn was stretched 7.82:1 in passing through an air gap to a water bath where it was quenched to a gel yarn. The gel yarn was stretched 3:1 at room temperature.

The mineral oil was extracted from the gel yarn by passage counter-current to a stream of trichlorotrifluoroethane and was then dried. Some stretching of the yarn occurred during extraction and drying. The dried yarn was stretched 6:1 at 150° C. The stretched UHMW PO yarn of the invention was of 354 denier (393 dtex) and had a tenacity of 41.1 g/d (36.3 cN/dtex).

The data for this example are summarized in Table I below.

Example 2

A 10 wt. % slurry of the same UHMW PO and mineral oil as in Example 1 was prepared in a mix tank and fed to the same extruder as described in Example 1. The extruder barrel temperature was 280° C. The screw rotational speed was 180 RPM. The UHMW PO/mineral oil slurry was converted to a liquid mixture at 280° C in passing through the extruder with an average residence time of 2.1 minutes. The average residence time in the extruder was therefore less than the quantity 0.6 D=0.6×4=2.4 min. where D is the extruder screw diameter in centimeters.

The throughput rate of slurry was 454 g/min and the throughput rate of UHMW PO was 45.4 grams/min. The throughput rate of UHMW PO in grams/min therefore exceeded the quantity $2.5 D^2=2.5\times(4)^2=40$ in this example of the invention.

The liquid mixture leaving the extruder passed through a gear pump and thence through a vessel consisting of an externally heated pipe at a temperature of 290° C, a length of 31.6 feet (9.63 meters), an internal volume of 17,026 cm$^3$ and several bends and changes in diameter. At intervals within the pipe there were three static mixers having L/D ratios of 8. The average residence time of the liquid/solution in this pipe vessel was 24.9 minutes in this example of the invention. The liquid mixture was converted to a solution in passing through the vessel.

The UHMW PO solution leaving the pipe vessel was passed through a gear pump and thence through a spin block and a spinneret having holes of 0.040 in. (1.016 mm) diameter to form a solution yarn of 118 filaments. The solution yarn was stretched 3.16:1 in passing through an air gap to a water quench bath. The gel yarn formed was stretched 3:16 at room temperature. The gel yarn was passed counter-current to a stream of trichlorotrifluoroethane to extract the mineral oil and dried. The yarn was stretched 1.47:1 during extraction and drying. The dried yarn was stretched 1.7:1 in a temperature interval between 133° C and 139° C and then stretched 5.1:1 at 150° C. The stretched UHMW PO yarn of the invention was of 497 denier (552 dtex) and had a tenacity of 46.6 g/d (41.1 cN/dtex).

The data for this example are summarized in Table I below.

Example 3

A 20 wt. % slurry of an UHMW PO (linear polyethylene having an intrinsic viscosity in decalin at 135° C of 18.3 dl/g, a melting point of 138° C and fewer than 0.5 substituents per 1000 carbon atoms) was prepared in white mineral oil (550 PO from Crompton Corporation) in a mix tank and maintained at a temperature of 90° C overnight. The slurry was continuously metered into the feed hopper of the same extruder as described in Example 1 at a rate of 810 g/min. The extruder barrel temperature was 280° C and its rotational speed was 300 RPM. A stream of the same white mineral oil preheated to a temperature of 280° C was metered into the extruder at the fifth barrel section from the feed end of the extruder at a rate of 270 g/min. The relative feed rates of the 20 wt. % UHMW PO slurry and the pre-heated mineral oil were such that a 15 wt % UHMW PO liquid mixture was formed in the extruder.

The throughput rate of liquid mixture was 1080 g/min and the throughput rate of UHMW PO was 162 g/min. The throughput rate of UHMW PO in grams/min therefore exceeded the quantity $10 D^2=10\times(4)^2=160$ in this example of the invention. The average residence time of the liquid mixture in the extruder was 0.9 minutes.

The liquid mixture leaving the extruder passed through a gear pump and thence through a vessel consisting of an externally heated pipe at a temperature of 280° C, having an internal volume of 9072 cm$^3$. Within the pipe there were two static mixers having L/D ratios of 8. The residence time of the liquid/solution in this pipe vessel was 5.7 minutes in this example of the invention. The liquid mixture was converted to a solution in passing through the vessel.

The UHMW PO solution leaving the pipe vessel was passed through a gear pump and thence through a spin block and a spinneret having holes of 0.040 in. (1.016 mm) diameter to form a solution yarn of 360 filaments. The solution yarn was stretched 3.07:1 in passing through an air gap to a water quench bath. The gel yarn formed was stretched 4.75:1 at room temperature. The gel yarn was passed counter-current to a stream of trichlorotrifluoroethane to extract the mineral oil and dried. The yarn was stretched 1.37:1 in the extraction step and 1.07:1 in the dryer. The dried yarn was stretched 3.58:1 at 150° C. The stretched UHMW PO yarn of the invention was of 712 denier (791 dtex) and had a tenacity of 27.2 g/d (24.0 cN/dtex).

The data for this example are summarized in Table I below.

Example 4

A 10 wt. % slurry of the same UHMW PO and mineral oil as in Example 1 was prepared in a mix tank and fed to the same extruder as described in Example 1. The extruder barrel temperature was 280° C. The screw rotational speed was 350 RPM. The UHMW PO/mineral oil slurry was converted to a liquid mixture in passing through the extruder. The throughput rate of slurry was 681 g/min and the throughput rate of UHMW PO was 68.1 grams/min. The throughput rate of UHMW PO in grams/min therefore exceeded the quantity 4 $D^2=4\times(4)^2=64$ in this example of the invention. The average residence time of the liquid mixture in the extruder was 1.4 minutes.

The liquid mixture leaving the extruder passed into a vessel consisting of an externally heated pipe at a temperature of 280° C, a length of 31.6 feet (9.63 meters), an internal volume of 17,026 cm$^3$ and several bends and changes in diameter. Within the pipe there were two static mixers having L/D ratios of 8. The residence time of the liquid/solution in this pipe vessel was 16.8 minutes in this example of the invention. The liquid mixture was converted to a solution in passing through the vessel.

The UHMW PO solution leaving the pipe vessel was passed through a gear pump and thence through a spin block and a spinneret having holes of 0.040 in. (1.016 mm) diameter to form a solution yarn of 118 filaments. The solution yarn was stretched 4:1 in passing through an air gap to a water quench bath. The gel yarn formed was stretched 2.5:1 at room temperature. The gel yarn was passed counter-current to a stream of trichlorotrifluoroethane to extract the mineral oil and dried. Some stretching of the yarn occurred during extraction and drying. The dried yarn was stretched 5.79:1 at 150° C. The stretched UHMW PO yarn of the invention was of 608 denier (676 dtex) and had a tenacity of 41.8 g/d (36.9 cN/dtex).

The data for this example are summarized in Table I below.

Example 5

A 12 wt. % slurry of the same UHMW PO and mineral oil as in Example 1 was prepared in a mix tank and fed to the same extruder as described in Example 1. The extruder barrel temperature was 280° C. The screw rotational speed was 200 RPM. The UHMW PO/mineral oil slurry was converted to a liquid mixture in passing through the extruder. The throughput rate of slurry was 665 g/min and the throughput rate of UHMW PO was 90.8 grams/min. The throughput rate of UHMW PO in grams/min therefore exceeded the quantity 4 $D^2=4\times(4)^2=64$ in this example of the invention. The average residence time of the liquid mixture in the extruder was 1.4 minutes.

The liquid mixture leaving the extruder passed through a gear pump and thence through a vessel consisting of an externally heated pipe at a temperature of 280° C, a length of 31.6 feet (9.63 meters), an internal volume of 17,026 cm$^3$ and several bends and changes in diameter. Within the pipe there were three static mixers having L/D ratios of 8. The residence time of the liquid/solution in this pipe vessel was 16.7 minutes in this example of the invention. The liquid mixture was converted to a solution in passing through the vessel.

The UHMW PO solution leaving the pipe vessel was passed through a gear pump and thence through a spin block and a spinneret having holes of 0.040 in. (1.016 mm) diameter to form a solution yarn of 118 filaments. The solution yarn was stretched 4:1 in passing through an air gap to a water quench bath. The gel yarn formed was stretched 2.5:1 at room temperature. The gel yarn was passed counter-current to a stream of trichlorotrifluoroethane to extract the mineral oil and dried. Some stretching of the yarn occurred during extraction and drying. The dried yarn was stretched 5.51 at 150° C. The stretched UHMW PO yarn of the invention was of 646 denier (718 dtex) and had a tenacity of 37.2 g/d (32.8 cN/dtex).

The data for this example are summarized in Table I below.

Example 6

A 10 wt % slurry was prepared of the same UHMW PO as in Example 1 in the same white mineral oil. The slurry was continuously fed into the feed hopper of an intermeshing twin screw extruder having a screw diameter of 58 mm (5.8 cm). The screw elements were all forwarding conveying elements. The free volume in this extruder (barrel volume minus screw volume) was 6476 cm$^3$. The extruder barrel temperature was 260° C. The screw rotational speed was 300 RPM. The UHMW PO/mineral oil slurry was converted to a liquid mixture in passing through the extruder. The throughput rate of slurry was 5319 g/min and the throughput rate of UHMW PO was 531.9 grams/min. The throughput rate of UHMW PO in grams/min therefore exceeded the quantity 10 $D^2=10\times(5.8)^2=336$ in this example of the invention. The average residence time of the liquid mixture in the extruder was 0.8 minutes. The liquid mixture leaving the extruder was passed through a gear pump.

The liquid mixture is then passed through a vessel consisting of an externally heated pipe at a temperature of 290° C, a length of 75 feet (22.86 meters), an internal volume of 60,000 cm$^3$ and having several bends and changes in diameter. At intervals within the pipe, there are nine static mixers having L/D ratios of 8. The residence time of the liquid/solution in this pipe vessel is projected to be 7.8 minutes. The liquid mixture is converted to a solution in passing through the vessel.

The UHMW PO solution leaving the pipe vessel is passed through through blocks, spin pumps and spinnerets to form six solution yarns of 240 filaments each. The solution yarns are stretched in passing through an air gap to a water quench bath. The gel yarns formed are stretched at room temperature, extracted to remove the mineral oil and dried. The dried yarns are stretched at 150° C. It is believed that the stretched yarns will have a tenacity at least 30 g/d (24.5 cN/dtex).

The data for this example are summarized in Table I below.

It will be seen that the UHMW PO throughput in grams/min exceeded the quantity 2.5 $D^2$ in each example of the invention. It will also be seen that the average residence time in the extruder in minutes was less than the quantity 0.6 D in each example of the invention, and that the average residence time in the vessel exceeded 2 minutes. Finally, it will be seen that the multi-filament yarns of the invention generally had tenacities that exceeded the tenacities of the prior art single filaments suggesting improved solution quality even though the fibers of the invention were spun at much higher concentrations.

Having thus described the invention in rather full detail, it will be understood that such detail need not be strictly adhered to but that further changes and modifications may suggest themselves to one skilled in the art, all falling with the scope of the invention as defined by the subjoined claims.

TABLE I

DATA SUMMARY

| Ex. | UHMW PO Conc., wt. % | D, Extruder Screw Diam., cm | Avg. Residence Time, min. Extruder | Avg. Residence Time, min. Vessel | Extruder Residence Time/D, min/cm | W, UHMW PO Thruput, g/min | W/D², g/min-cm² | Fiber/Yarn Tenacity, cN/dtex |
|---|---|---|---|---|---|---|---|---|
| Comp. 1 | 20 | 3 | 3.0 | none | 1.00 | 18.0 | 2.00 | n.a. |
| Comp. 2a | 3 | 3 | 2.1 | none | 0.70 | 3.81 | 0.42 | 33 (best) |
| Comp. 2b | 5 | 3 | 12.0 | none | 4.00 | 6.35 | 0.70 | 29.9 (best) |
| 1 | 10 | 4 | 2.3 | 46.7 | 0.58 | 42.36 | 2.65 | 36.3 |
| 2 | 10 | 4 | 2.1 | 24.9 | 0.52 | 45.4 | 2.84 | 41.1 |
| 3 | 15 | 4 | 0.9 | 5.7 | 0.22 | 162 | 10.13 | 24.0 |
| 4 | 10 | 4 | 1.4 | 16.8 | 0.35 | 68.1 | 4.26 | 36.9 |
| 5 | 12 | 4 | 1.4 | 16.7 | 0.35 | 90.8 | 5.68 | 32.8 |
| 6 | 10 | 5.8 | 0.8 | 7.8* | 0.14 | 531.9 | 15.81 | n.a. | n.a. - not available
*projected

What is claimed is:

1. A process for the continuous preparation of solutions comprising up to 50 wt. % of an UHMW PO having an intrinsic viscosity from 5 to 45 dl/g measured in decalin at 135° C comprising the steps of:
    a) forming a slurry of UHMW PO particles in a solvent for the UHMW PO at a first temperature which is below the temperature at which said UHMW PO particles will dissolve in said solvent;
    b) processing said slurry through an extruder operating such that a mixture of said solvent and said UHMW PO is formed at aseond temperature above the melting temperature of said UHMW PO, and the throughput rate of UHMW PO is at least the quality 2.5 $D^2$ (2.5×D×D) grams per minute, where D represents the screw diameter of said extruder in centimeters, the mixture containing domains of molten polymer and solvent having sizes of microscopic dimensions;
    c) discharging said mixture from the extruder; and
    d) passing said mixture through a heated vessel at a temperature above the melting temperature of said UHMW PO in said solvent, said heated vessel having a volume such that the average residence time of the mixture in said vessel is from 2 to 120 minutes, whereby a homogeneous solution of said UHMW PO is formed having the UHMW PO dissolved in the solvent.

2. The process of claim 1, wherein forming the slurry includes maintaining the slurry in an agitated mixing tank at a temperature below the temperature at which the UHMW PO will dissolve in the solvent and for a time sufficient that the UHMW PO particles absorb at least 5 wt. % of the solvent prior to processing said slurry through an extruder.

3. The process of claim 1, wherein the throughput rate of UHMW PO is at least 4 $D^2$ grams/min where D represents the screw diameter of the extruder in centimeters.

4. The process of claim 1, wherein the throughput rate of UHMW PO is at least 6 $D^2$ grams/min, where D represents the screw diameter of the extruder in centimeters.

5. The process of claim 1, wherein the throughput rate of UHMW PO is at least 10 $D^2$ grams/min, where D represents the screw diameter of the extruder in centimeters.

6. The process of claim 1, wherein the throughput rate of UHMW PO is from 2.5 $D^2$ to 40 $D^2$ grams/min where D represents the screw diameter of the extruder in centimeters.

7. The process of claim 1 wherein said extruder is an intermeshing co-rotating twin-screw extruder.

8. The process of claim 7 where the screw elements of said extruder are forwarding conveying elements.

9. The process of claim 1 wherein the average residence time of the mixture in said heated vessel is from 2 to 90 minutes.

10. The process of claim 1 wherein said heated vessel is a pipe having bends.

11. The process of claim 1 wherein the UHMW PO concentration in said solution is from 2 to 30 wt. %.

12. The process of claim 1, wherein the UHMW PO concentration in said solution is from 5 to 20 wt. %.

13. The process of claim 1 wherein the slurry is fed to the extruder under a pressure of greater than 20 kPa.

14. The process of claim 1 wherein UHMW PO particles and said solvent are introduced into the extruder in separate feed streams and the slurry is formed within the extruder.

15. The process of claim 14 wherein said solvent has been preheated to a temperature above the melting temperature of said UHMW PO in said solvent.

16. The process of claim 1 wherein a concentrated slurry of said UHMW PO in said solvent is introduced at the feed section of the extruder and a separate solvent stream preheated to a temperature above the melting temperature of said UHMW PO, is introduced into the extruder downstream of the extruder feed section.

17. The process of claim 1 wherein said heated vessel is a pipe comprising sections of differing length and diameter.

18. The process of claim 17 wherein the pipe contains one or more static mixers.

19. The process of claim 1 wherein the UHMW PO is a linear polyethylene having an intrinsic viscosity measured in decalin at 135° C. from 9 to 30 dl/g.

20. The process of claim 19 wherein the linear polyethylene has fewer than two substituent groups per 1000 carbon atoms.

21. The process of claim 19 wherein the linear polyethylene has fewer than one substituent group per 1000 carbon atoms.

22. The process of claim 1 wherein said solvent is selected from the group consisting of aliphatics, aromatics, cyclo-aliphatics, halogenated aliphatics, halogenated aromatics, halogenated cyclo-aliphatics and mixtures thereof.

23. The process of claim 1 where said solvent is selected from the group consisting of mineral oil-and decalin.

24. A process for the continuous preparation of molded articles from slurries of UHMW PO comprising the steps:

a) forming a slurry of UHMW PO particles having an intrinsic viscosity measured in decalin at 135° C of from 5 to 45 dl/g in a solvent for the UHMW PO at a first temperature which is below the temperature which said UHMW PO will dissolve in said solvent:

b) processing said slurry through an extruder operating such that a mixture of said solvent and said UHMW PO is formed at a second temperature above the melting temperature of said UHMW PO, and throughput rate of UHMW PO in said mixture is at least the quantity $2.5 D^2$ ($2.5 \times D \times D$) grams per minute wherein D represents the screw diameter of the extruder in centimeters, the mixture containing domains of molten polymer and solvent having sizes of microscopic dimensions;

c) discharging said mixture from the extruder;

d) passing said mixture through a heated vessel at a temperature above the melting temperature of said UHMW PO, said vessel having a volume such that the average residence time of the mixture in said vessel is from 2 to 120 minutes, whereby a homogeneous solution of said UHMW PO is formed having the UHMW PO dissolved in the solvent;

e) passing the thus formed solution out of said heated vessel through a positive displacement pump and through a shaping orifice, said solution being at a temperature below the atmospheric boiling point of said solvent to form a molded solution article;

f) stretching the molded solution article;

g) cooling the solution article to obtain a molded gel article;

h) stretching the molded gel article;

i) substantially removing the solvent from said molded gel article to form a molded solid article; and j) optionally stretching the molded solid article in one or more steps at temperatures from 25° C. to 165° C.

25. The process of claim 24, wherein forming the slurry includes maintaining the slurry in an agitated mixing tank at a temperature below the temperature at which the UHMW PO will dissolve in the solvent and for a time sufficient that the UHMW PO particles absorb at least 5 wt. % of the solvent prior to processing said slurry through an extruder.

26. The process of claim 24, wherein the throughput rate of UHMW PO is from $2.5 D^2$ to $40 D^2$ grams/min where D represents the screw diameter of the extruder in centimeters.

27. The process of claim 24, wherein said molded gel article is a fiber, tape, film, sheet or tube.

28. The process of claim 24, wherein said molded solid article is a fiber, tape, film, sheet or tube.

29. The process of claim 1 wherein said solvent is selected from the group consisting of halogenated aliphatics, halogenated aromatics, halogenated cyclo-aliphatics and mixtures thereof.

30. A process for the continuous preparation of molded articles from slurries of UHMW PO comprising the steps:

a) forming a slurry of UHMW PO particles having an intrinsic viscosity measured in decalin at 135° C. of from 5 to 45 dl/g in a solvent for the UHMW PO at a first temperature which is below the temperature which said UHMW PO will dissolve in said solvent:

b) processing said slurry through a extruder operating such that a mixture of said solvent and said UHMW PO is formed at a second temperature above the melting temperature of said UHMW PO, and the throughput rate of UHMW PO in said mixture is at least the quantity $2.5 D^2$ ($2.5 \times D \times D$) grams per minute wherein D represents the screw diameter of extruder in centimeters, the mixture containing domains of molten polymer and solvent having sizes of microscopic dimensions;

c) discharging said mixture from the extruder;

d) passing said mixture through a heated vessel at a temperature above the melting temperature of said UHMW PO, said vessel having a volume such that the average residence time of the mixture in said vessel is from 2 to 120 minutes, whereby a homogeneous solution of said UHMW PO is formed having the UHMW PO dissolved in the solvent;

e) passing the thus-formed solution out of said heated vessel through a positive displacement pump and through a shaping orifice, said solution being at a temperature below the atmospheric boiling point of said solvent to form a molded solution article;

f) stretching the molded solution article;

g) cooling the solution article to obtain a molded gel article;

h) stretching the molded gel article;

i) substantially removing the solvent from said molded gel article to form a molded solid article; and j) stretching the molded solid article in one or more steps at temperatures from 25° C to 165° C.

* * * * *